United States Patent [19]

Hergenrother et al.

[11] 4,427,828
[45] Jan. 24, 1984

[54] IMPACT RESISTANT POLYMERIC COMPOSITIONS CONTAINING POLYAMIDES, MALEIC ANHYDRIDE ADDUCTS OF HYDROGENATED POLYMERS AND GRAFT COPOLYMERS THEREOF

[75] Inventors: William L. Hergenrother, Akron, Ohio; Mark G. Matlock, Decatur, Ill.; Richard J. Ambrose, Erie, Pa.

[73] Assignee: The Firestone Tire & Rubber Company, Akron, Ohio

[21] Appl. No.: 410,094

[22] Filed: Aug. 20, 1982

Related U.S. Application Data

[63] Continuation-in-part of Ser. No. 298,424, Sep. 1, 1981, abandoned, which is a continuation of Ser. No. 115,635, Jan. 28, 1980, abandoned, which is a continuation of Ser. No. 31,577, Apr. 19, 1979, abandoned.

[51] Int. Cl.$^3$ .............................................. C08L 77/00
[52] U.S. Cl. ..................... 525/66; 525/183; 525/92
[58] Field of Search ................... 525/66, 183

[56] References Cited

U.S. PATENT DOCUMENTS

| | | | |
|---|---|---|---|
| 3,465,059 | 9/1969 | Seven | 260/857 G |
| 3,539,664 | 11/1970 | Kray | 260/857 G |
| 3,634,543 | 1/1972 | Sherman | 260/857 L |
| 3,644,571 | 2/1972 | Anderson | 260/857 L |
| 3,673,277 | 6/1972 | Schmitt | 260/857 L |
| 3,963,799 | 6/1976 | Starkweather | 260/857 L |
| 3,972,961 | 8/1976 | Hammer | 260/857 G |
| 3,976,720 | 8/1976 | Hammer | 260/857 G |
| 4,017,557 | 4/1977 | Hammer | 260/857 G |
| 4,078,014 | 3/1978 | Starkweather | 260/857 L |
| 4,283,502 | 8/1981 | Richardson | 525/66 |
| 4,320,213 | 3/1982 | Woodbrey | 525/183 |

FOREIGN PATENT DOCUMENTS

| | | | |
|---|---|---|---|
| 45-30945 | 10/1970 | Japan | 260/857 L |
| 50-98937 | 8/1975 | Japan | 260/857 G |

Primary Examiner—Paul Lieberman
Attorney, Agent, or Firm—Frank J. Troy, Sr.

[57] ABSTRACT

Polymeric compositions having resistance to impact comprising (a) from about 50 to about 90 percent by weight of a polyamide having a number average molecular weight of at least 10,000 and (b) from about 10 to about 50 percent by weight of a maleic anhydride adduct of a hydrogenated polymer of one or more conjugated dienes or a hydrogenated copolymer of a conjugated diene and a vinyl aromatic hydrocarbon, said hydrogenated polymer or copolymer having a residual unsaturation content of from about 0.5 to about 20% of its original unsaturation content prior to hydrogenation; wherein at least 5 percent by weight of components (a) and (b) are present in the form of a graft copolymer containing at least 20 percent of polyamide. The compositions exhibit especially advantageous properties, particularly high impact strength and are useful in a variety of molding applications such as molded bushings, gears, cams, valves and a variety of other products.

12 Claims, No Drawings

IMPACT RESISTANT POLYMERIC COMPOSITIONS CONTAINING POLYAMIDES, MALEIC ANHYDRIDE ADDUCTS OF HYDROGENATED POLYMERS AND GRAFT COPOLYMERS THEREOF

This application is a continuation-in-part of Ser. No. 298,424, filed Sept. 1, 1981, abandoned, which is a continuation of Ser. No. 115,635, filed Jan. 28, 1980, abandoned, which is a continuation of Ser. No. 031,577, filed Apr. 19, 1979, abandoned.

BACKGROUND OF THE INVENTION

The invention relates to impact resistant polymeric compositions containing polyamides, maleic anhydride adducts of hydrogenated polymers and graft copolymers thereof. More particularly, the invention relates to impact resistant polymeric compositions containing polyamides and maleic anhydride adducts of hydrogenated polymers of conjugated dienes and hydrogenated copolymers of conjugated dienes and vinyl aromatic hydrocarbons in which at least 5 percent by weight of the polyamide and the maleic anhydride adduct are present in the form of a graft copolymer containing at least 20 percent polyamide.

U.S. Pat. Nos. 3,236,914 and 3,274,289 to Murdock et al disclose blends of polyamides and carboxylated copolymers which are said to produce molded products having high impact resistance and good thermal rigidity. These patents teach that the carboxylated copolymers contain from 1 to 25 percent of free carboxyl groups and that they may be derived from unsaturated neutral monomers such as ethylene, propylene, styrene, 1,3-butadiene, vinyl monomers, acrylates, and the like, and unsaturated carboxylic acids such as acrylic acid, methacrylic acid, maleic acid, itaconic acid and the like. However, the patents do not disclose or suggest compositions containing maleic anhydride adducts of hydrogenated polymers or copolymers and graft copolymers of polyamides and maleic anhydride adducts of hydrogenated polymers or copolymers. Moreover, blend compositions such as those described in the Murdock et al patents are difficult to blend on a mill and often result in the production of rough moldings or extrudates.

U.S. Pat. No. 3,842,029 to Saito et al discloses synthetic resin compositions comprising glass fibers, polyamides and thermoplastic block copolymers of conjugated diolefins and monovinyl aromatic hydrocarbons. However, the patent does not disclose or suggest compositions containing maleic anhydride adducts of hydrogenated polymers or copolymers and graft copolymers of polyamides and maleic anhydride adducts of hydrogenated polymers or copolymers.

U.S. Pat. No. 4,041,103 to Davison et al discloses polymer blends of certain selectively hydrogenated block copolymers and polyamides. However, the patent does not disclose or suggest compositions containing maleic anhydride adducts of hydrogenated polymers or copolymers and graft copolymers of polyamides and maleic anhydride adducts of hydrogenated polymers or copolymers.

U.S. Pat. No. 4,085,163 to Gergen et al discloses multicomponent blends comprising polyamides, selectively hydrogenated block copolymers of conjugated dienes and monoalkenyl arenes and at least one dissimilar engineering thermoplastic which may be selected from polyolefins, polyesters, poly(aryl ethers), polyurethanes, poly(aryl sulfones) etc. However, the patent does not disclose or suggest compositions containing maleic anhydride adducts of hydrogenated polymers or copolymers and graft copolymers of polyamides and maleic anhydride adducts of hydrogenated polymers or copolymers.

U.S. Pat. No. 4,174,358 to Epstein discloses multiphase thermoplastic compositions consisting essentially of one phase containing 60 to 99 percent by weight of a polyamide having a number average molecular weight of at least 5,000 and 1 to 40 percent by weight of at least one other phase containing particles of at least one polymer having a number average molecular weight of at least 5,000 and 1 to 40 percent by weight of at least one other phase containing particles of at least one polymer having a particle size in the range of 0.01 to 3.0 microns and being adhered to the polyamide. An extremely broad range of polymers or polymer mixtures which can be utilized as the at least one other phase polymer are described. However, the patent does not disclose or suggest compositions containing maleic anhydride adducts of hydrogenated polymers of conjugated dienes or hydrogenated copolymers of conjugated dienes and vinyl aromatic hydrocarbons and graft copolymers of polyamides with maleic anhydride adducts of such hydrogenated polymers or copolymers as is the case in the compositions of the present invention.

SUMMARY OF THE INVENTION

In accordance with this invention, impact resistant polymeric compositions are provided which comprises (a) from about 50 to about 90 percent by weight of a polyamide having a number average molecular weight of at least 10,000 and (b) from about 10 to about 50 percent by weight of a maleic anhydride adduct of a hydrogenated polymer of a conjugated diene or a hydrogenated copolymer of a conjugated diene and a vinyl aromatic hydrocarbon, said hydrogenated polymer or copolymer having a residual unsaturation content of from about 0.5 to about 20 percent of its original unsaturation content prior to hydrogenation, wherein at least 5 percent by weight of components (a) and (b) are present in the form of a graft copolymer containing at least 20 percent of polyamide. The compositions exhibit especially advantageous properties, particularly high impact strengths.

The compositions of the invention are characterized by their relatively simple process of preparation which obviates the necessity for complex copolymerization and grafting procedures.

DETAILED DESCRIPTION OF THE INVENTION

As indicated, the polymeric compositions of this invention, which are thermoplastic in nature, contain polyamides, maleic anhydride adducts of hydrogenated polymers or copolymers and a proportion of graft copolymer formed from these components.

A. The Polyamide Component

By polyamide is meant a condensation product which contains recurring aromatic and/or aliphatic amide groups as integral parts of the main polymer chain, such products being known generically as "nylons". These may be obtained by polymerizing a monoaminomonocarboxylic acid or an internal lactam thereof having at least two carbon atoms between the amino and carboxylic acid groups, or by polymerizing substantially equimolar proportions of a diamine which contains at least two carbon atoms between the amino groups and a dicarboxylic acid; or by polymerizing a monoaminocarboxylic acid or an internal lactam thereof as defined above together with substantially equimolecular proportions of a diamine and a dicarboxylic acid. The dicarboxylic acid may be used in the form of a functional derivative thereof, for example, an ester.

The term "substantially equimolecular proportions" (of the diamine and of the dicarboxylic acid) is used to cover both strict equimolecular proportions and the slight departures therefrom which are involved in conventional techniques for stabilizing the viscosity of the resultant polyamides.

As examples of the said monoaminomonocarboxylic acids or lactams thereof there may be mentioned those compounds containing from 2 to 16 carbon atoms between the amino and carboxylic acid groups, said carbon atoms forming a ring with the —CO NH— group in the case of a lactam. As particular examples of aminocarboxylic acids and lactams, there may be mentioned ε-aminocaproic acid, butyrolactam, pivalolactam, caprolactam, capryl-lactam, enantholactam, undecanolactam, dodecanolactam and the like.

Examples of the said diamines are diamines of the general formula $H_2N(CH_2)_nNH_2$ wherein n is an integer of from 2 tp 16, such as trimethylenediamine, tetramethylenediamine, pentamethylenediamine, octamethylenediamine, decamethylenediamine, dodecamethylenediamine, hexadecamethylenediamine, and the like.

C-alkylated diamines, e.g., 2,2-dimethylpentamethylenediamine and 2,2,4- and 2,4,4-trimethylhexamethylenediamine are further examples. Other diamines which may be mentioned as examples are aromatic diamines, e.g., p-phenylenediamine, 4,4'-diaminodiphenyl sulphone, 4,4'-diaminodiphenyl ether and 4,4'-diaminodiphenyl sulphone, 4,4'-diaminodiphenyl ether and 4,4'-diaminodiphenylmethane; and cycloaliphatic diamines, for example, diaminodicyclohexylmethane.

The dicarboxylic acids may be aromatic, for example, isophthalic and terephthalic acids. Preferred dicarboxylic acids are of the formula HOOC Y COOH wherein Y represents a divalent aliphatic radical containing at least 2 carbon atoms, and examples of such acids are sebacic acid, octadecanedioic acid, suberic acid, azelaic acid, undecanedioic acid, glutaric acid, pimelic acid, adipic acid, and the like.

Illustrative examples of polyamides which may be incorporated in the polymeric compositions of the invention include: polyhexamethylene adipamide (nylon 6:6), polypyrrolidone (nylon 4), polycaprolactam (nylon 6), polyheptolactam (nylon 7), polycapryllactam (nylon 8), polynonanolactam (nylon 9), polyundecanolactam (nylon 11), polydodecanolactam (nylon 12), polyhexamethylene azelaamide (nylon 6:9), polyhexamethylene sebacamide (nylon 6:10), polyhexamethylene isophthalamide (nylon 6:iP), polymethaxylylene adipamide (nylon MXD:6), polyamide of hexamethylenediamine and n-dodecanedioic acid (nylon 6:12), polyamide of dodecamethylenediamine and n-dodecanedioic acid (nylon 12:12).

Nylon copolymers may also be used, for example, copolymers of the following: hexamethylene adipamide/caprolactam (nylon 6:6/6), hexamethylene adipamide/hexamethylene-isophthalamide (nylon 6:6 iP), hexamethylene adipamide/hexamethyleneterephthalamide (nylon 6:6/6T), hexamethylene adipamide/hexamethylene-azelaamide (nylon 6:6/6:9), hexamethylene adipamide/hexamethyleneazelaamide/caprolactam (nylon 6:6/6:9/6).

Preferred nylons include 6,6:6, 11 and 12.

The polyamides which are employed in the compositions of the invention must have number average molecular weight ($M_n$) of at least 10,000 and may have molecular weights ($M_n$) of from 10,000 to 50,000. Preferred polyamides are those having number average molecular weights ($M_n$) of at least 15,000. In addition, such polyamides should have amine equivalent contents of 0.1 milliequivalents per gram or less.

The amount of polyamide included in the compositions of the invention may vary widely depending upon the properties desired in the composition. In general, the amounts of polyamide included in the composition may range from about 50 to about 90 percent by weight based on total weight of composition. Preferred amounts of polyamide are from 70 to 85 percent by weight with a particularly preferred amount being from 80 to 85 percent by weight, as these amounts appear to impart excellent impact resistance to the finished composition.

B. The Maleic Anhydride Adduct Component

The term "maleic anhydride adduct" as employed herein refers to polymer products containing pendent succinic anhydride groups which are formed by reacting maleic anhydride with hydrogenated polymers of conjugated dienes or hydrogenated copolymers of conjugated dienes and vinyl aromatic hydrocarbons containing a residual unsaturation level of from 0.5 to 20.0 percent of their original unsaturation level prior to hydrogenation. The reaction which is conducted by heating a mixture of the maleic anhydride and hydrogenated polymer or copolymer containing residual unsaturation proceeds by means of a reaction mechanism referred to as an "ENE" type reaction. The reaction scheme in simplified form utilizing a hydrogenated polybutadiene containing residual unsaturation for illustrative purposes proceeds as follows:

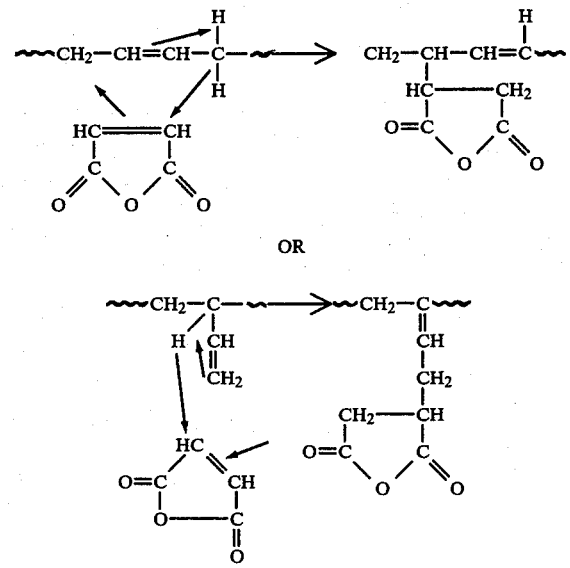

In the above formulas, the wavy lines represent the remainder of the hydrogenated polybutadiene polymer chain.

As indicated by the above reaction scheme, the residual unsaturation of the hydrogenated polybutadiene undergoes an "ENE" type reaction with the maleic anhydride to produce a polymer product containing pendent succinic anhydride groups. As will be discussed hereinafter, this polymer by virtue of the presence of the pendent succinic anhydride group can be reacted under appropriate conditions with the amide or amine groups of the polyamide to produce a proportion of graft copolymer.

As indicated, the maleic anhydride adduct is prepared by reacting maleic anhydride with a hydrogenated polymer containing residual unsaturation. The amounts of maleic anhydride employed in the reaction can vary considerably depending on the specific nature of the hydrogenated polymer and the properties desired in the polymer product. In general, the amount of maleic anhydride employed may range from about 0.1 to about 25 percent by weight based on total weight of maleic anhydride and hydrogenated polymer with a preferred amount being from 0.2 to 5 percent by weight.

Various polymers of conjugated dienes and copolymers of conjugated dienes and vinyl aromatic hydrocarbons may be hydrogenated for use in preparing the maleic anhydride adduct component of the compositions of the invention. Polymers of conjugated dienes which may be hydrogenated include polymers derived from one or more conjugated diene monomers. Thus, polymers derived from a single conjugated diene such as 1,3-butadiene (i.e., a homopolymer) or polymers derived from two or more conjugated dienes such as, for example, 1,3-butadiene and isoprene or 1,3-butadiene and 1,3-pentadiene (i.e., a copolymer) and the like may be utilized. Copolymers which may be hydrogenated include random copolymers of conjugated dienes and vinyl aromatic hydrocarbons and block copolymers of conjugated dienes and vinyl aromatic hydrocarbons which exhibit elastomeric properties.

Polymers of conjugated dienes which may be utilized include those having prior to hydrogenation 1,2- and 3,4-microstructure contents of from about 100% to about 0.1% and 1,4-microstructure contents of from about 99% to about 0.1%. A preferred polymer of a conjugated diene is a medium vinylpolybutadiene which prior to hydrogenation has a 1,2-microstructure content of from about 40 to about 60 mole percent. Such polymers of conjugated dienes can be prepared by any well known process. Thus, for example, polymers of conjugated dienes having relatively low vinyl or 1,2-microstructure contents may be prepared in known manner by anionically polymerizing the diene monomer using a lithium-based catalyst and an inert hydrocarbon diluent. Medium vinyl polybutadienes may be prepared in known manner by anionically polymerizing the diene monomer in the presence of a catalyst system consisting of an alkyl lithium initiator such as n-butyl lithium and a modifier such as N,N,N',N'-tetramethyl-1,2-ethanediamine (TMEDA), 1,2-dipiridyl ethane (DPE) or 1,2-di-(N-methyl-piperazinyl-N')-ethane (DMPE) and an inert hydrocarbon diluent. Typical procedures for preparing medium vinyl or high vinyl polybutadienes are described in U.S. Pat. Nos. 3,451,988 and 4,226,952, the disclosures of which are incorporated herein by reference.

Random copolymers of conjugated dienes and vinyl aromatic hydrocarbons which may be utilized include those having 1,2-microstructure contents prior to hydrogenation of from about 10% to about 100%. The copolymers may contain up to about 60 percent by weight of vinyl aromatic hydrocarbon. Such copolymers are well known in the art. They may be produced by any well known process. For example, the random copolymer can be prepared by charging a mixture of conjugated diene and vinyl aromatic hydrocarbon monomers to a polymerization reactor at a rate slower than the normal polymerization rate as described in U.S. Pat. No. 3,094,512 or by copolymerizing a mixture of the monomers in the presence of a randomizing agent such as an ether, amine, chelating diamine or other polar compound as illustrated in U.S. Pat. No. 3,451,988.

Block copolymers of conjugated dienes and vinyl aromatic hydrocarbons which may be utilized include any of those which exhibit elastomeric properties and which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which have structures represented by the formulae A-B, A-B-A, A-B-A-B, B-A, B-A-B, B-A-B-A and the like wherein A is a polymer block of a vinyl aromatic hydrocarbon or a conjugated diene/vinyl aromtic hydrocarbon tapered copolymer block and B is a polymer block of a conjugated diene.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene (isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usally preferred to employ the commercially available polymer as this serves the reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content of from about 0.5 to about 20 percent of their original unsaturation content prior to hydrogenation.

As indicated heretofore, the maleic anhydride adduct component of the compositions of the invention is prepared by a relatively uncomplicated process which does not require complex copolymerization or grafting procedures. Thus, the maleic anhydride adduct can be prepared by first forming a homogeneous mixture or solution of the maleic anhydride and the hydrogenated polymer or copolymer containing residual unsaturation and then reacting the resultant mixture or solution under appropriate conditions of time and temperature. In forming the homogeneous mixture, the maleic anhydride preferably in particle form and the hydrogenated polymer or copolymer in solid form can be mixed in any convenient mixing apparatus such as, for example, a two-roll mill or a mixing extruder. In the solution method, the maleic anhydride and the hydrogenated polymer or copolymer can be separately dissolved in aliphatic or aromatic solvents such as toluene, heptane, xylene, chlorobenzene or the like and the solutions then combined or both components may be dissolved together in an appropriate solvent. When the solution method is employed, the solvent can be removed following the reaction by any convenient drying method such as, for example, drum drying.

The specific conditions employed in reacting the resultant mixture or solution of maleic anhydride and hydrogenated polymer or copolymer can vary considerably depending on factors such as the specific amounts of ingredients and the nature of the hydrogenated polymer or copolymer and its reactivity. Thus, temperatures may range from 130° to 320° C. with a preferred range being from 170° to 300° C. Times may range from 0.001 hour to 200 hours, depending on the specific temperature utilized, nature of the hydrogenated polymer or copolymer, etc. In addition, it is preferred to conduct the reaction under an inert gas such as nitrogen.

The amounts of maleic anhydride adduct component included in the compositions of the invention may vary somewhat depending upon the properties desired in the finished composition. In general, the amounts of maleic anhydride adduct included in the composition may range from about 10 to about 50 percent by weight based on total weight of composition. Preferred amounts of maleic anhydride adduct are from 15 to 30 percent by weight with a particularly preferred amount being from 15 to 20 percent by weight.

C. Preparation of Finished Composition

The finished composition of the invention which includes a proportion of graft copolymer can be prepared by an uncomplicated process which involves mixing the polyamide and maleic anhydride adduct and then homogenizing the resultant mixture in a suitable homogenizing apparatus under appropriate conditions of time and temperature. The process results in the production of a finished composition containing a graft copolymer component without the necessity of using complex grafting techniques.

In forming the mixture of polyamide and maleic anhydride adduct, the polyamide and maleic anhydride adduct components, preferably in the form of small particles, are mixed together using any convenient mixing apparatus. The resultant mixture is then homogenized in a suitable homogenizing apparatus, preferably a mixing extruder containing twin screws. The extruder temperature and residence time can vary somewhat depending on the specific composition of the mixture and the degree of grafting desired. Thus, temperatures may range from 180° to 320° C. and residence times may range from less than 1 minute to 150 minutes.

As indicated, the homogenizing process results in the production of a proportion of graft copolymer formed from the polyamide and maleic anhydride adduct components. The reason for this fact is that under appropriate temperature and time conditions, the pendent succinic anhydride groups of the maleic anhydride adduct will react with either the amide groups or terminal amino groups of the polyamide to form an amount of graft copolymer containing amide or imide linkages. The specific amount of graft copolymer which is formed is dependent on a number of factors including the specific proportions of polyamide and maleic anhydride modified polymer, the mixing or homogenizing temperature, the residence time and the nature of the maleic anhydride adduct (i.e., proportion of pendent succinic anhydride groups).

The reaction scheme (in simplified form) by which the graft copolymer is formed from the maleic anhydride adduct and polyamide (e.g., polycaprolactam) components is believed to proceed along either of the following paths:

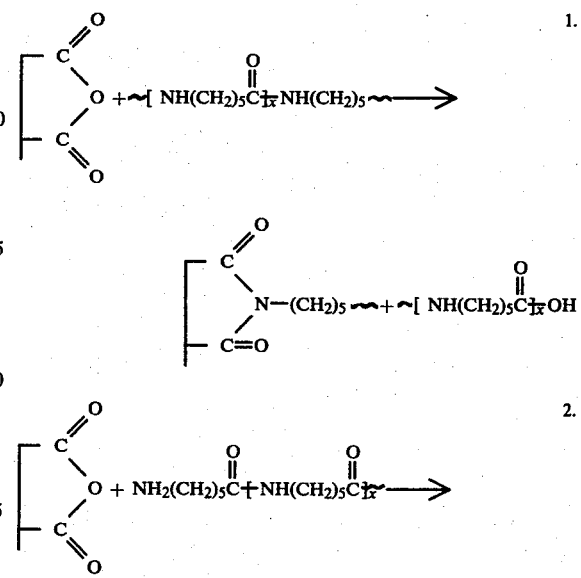

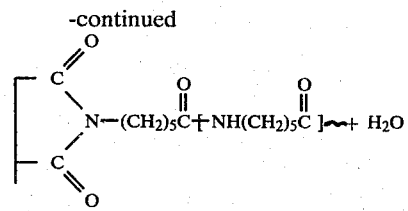

In the above formulas, the wavy lines represent the remainder of the nylon polymer chain.

As mentioned above and as indicated in the foregoing reaction scheme, the pendent succinic anhydride groups of the maleic anhydride adduct can react with either the amide groups (pathway (1) of the reaction scheme) or the amino groups (pathway (2) of the reaction scheme) of the polyamide. Under ordinary circumstances, the reaction very likely proceeds along the path designated (2) due to the greater reactivity of the amino group. However, in the absence of terminal amine groups and if sufficient time is provided, the reaction can also proceed along the pathway designated (1) in the reaction scheme (i.e., with the amide groups).

It should be observed at this time that residence times appear to be a major factor in both the amount of graft copolymer formed and the properties obtained in the finished composition. Thus, under constant temperatures increased residence times often produce improved properties including higher impact resistance.

In preparing the compositions of the present invention, it is preferred to produce a finished composition containing at least 5 percent by weight of the polyamide and maleic anhydride adduct components in the form of a graft copolymer containing at least 20 percent of polyamide. The upper limit in the amount of graft copolymer included in the composition is governed by the properties desired in the finished composition, particularly the level of impact resistance. In general, the compositions may contain from about 5 percent to about 75 percent by weight of the graft copolymer component with a preferred range being from 5 to 40 percent by weight.

Following the homogenization procedure, the resultant product is then cooled rapidly as by water quenching, chopped into particles (preferably pellets) and then dried. The resulting particles or pellets can then be injection molded to form valuable molded products.

The following tests were used in the examples to provide physical property measurements of the compositions of the invention.

The Rockwell M value is a hardness test determined by the standard ASTM D-785 test. The Izod impact strength test was determined by standard ASTM D-256-73. Samples are injection molded at 190°–220° C. in the form of bars 5 inches×0.5 inch×0.125 inch or 0.250 inch into which notches are machined and cut into length as specified in ASTM D-256-73. Samples are allowed to condition at room temperature for 16 to 24 hours after cutting and notching before testing. Five bars of each sample are tested and the average value reported as the Izod impact strength in ft.lbs./inch of notch. Flexural modulus is measured in psi by standard ASTM D-790-71. Samples are molded at 190° to 220° C. in a laboratory press or injection molded in the form of 3 inch×1.0 inch×0.125 bars. The bars are conditioned at room temperature for 16 to 24 hours before testing. The test is conducted using a 2 inch span at a crosshead speed of 0.50 inch/min. The flexural modulus and strength are calculated using the equations given in the ASTM procedure. The heat distortion temperature (HDT) is determined by the standard test ASTM D-648 using 264 psi and 66 psi loads.

The finished compositions were analyzed for amount of graft copolymer, amount of nylon in the graft copolymer and amount of free rubber (i.e., hydrogenated polymer or polymer adduct) using a coacervation procedure. In this procedure, 1.50 grams of composition were first dissolved in 30 ml. of m-cresol. Then, the resultant solution was diluted with 120 ml. of cyclohexane. The resultant suspension was then centrifuged to produce a large clear cyclohexane rich top layer and a small cresol rich lower layer. The top layer was removed by siphoning or decantation and then coagulated in 500 ml of methanol, filtered, washed in methanol, dried and weighed. The free rubber was obtained from this fraction by extracting the material with refluxing toluene for 48 hours. Then, 150 ml of an 81/19 cyclohexane/m-cresol mixture was added to the solution in the cresol-rich lower layer. The centrifugation and siphoning procedure was repeated and a second fraction was obtained. Subsequent fractions were obtained with 150 ml of 80/20, 79.5/20.5, 79/21, 78/22, 77/23, 76/24, 75/25 and 65/35 cyclohexane/m-cresol mixtures. All fractions were coagulated by adding them slowly to methanol and were collected on tared funnels. After washing with methanol, the samples were dried and weight of material was obtained.

For a more detailed description of this type procedure, reference may be made to the article entitled: "Block Polymers From Isocyanate-Terminated Intermediates. II. Preparation of Butadiene-$\epsilon$-caprolactam and Styrene-$\epsilon$-Caprolactam Block Polymers" by William L. Hergenrother and Richard J. Ambrose appearing in the Journal of Polymer Science, Polymer Chemistry Edition, Volume 12, pages 2613–2622 (1974), particularly page 2615 under the heading

FRACTIONATION PROCEDURES

The following examples are submitted for the purpose of further illustrating the nature of the present invention and are not intended as a limitation on the scope thereof. Parts and percentages referred to in the examples are by weight unless otherwise indicated.

Example 1

A hydrogenated polybutadiene polymer having a weight average molecular weight $M_w$ of 170,000 was prepared by hydrogenating a polybutadiene originally containing 99 percent 1,2-microstructure content to a 90 percent saturation level (i.e., 8–10 percent residual unsaturation content). The hydrogenated polymer was dissolved in toluene to produce a 30 percent solids solution of the polymer. To this solution was added a solution of maleic anhydride in toluene containing 5 percent weight of maleic anhydride based on the weight of hydrogenated polymer. The combined solution was heated at 200° C. for 24 hours, then cooled and drum dried. The resultant maleic anhydride adduct was chopped into particles and combined with pellets of polycaprolactam (Nylon 6) to produce a mixture containing 15 percent by weight of maleic anhydride adduct. The resultant mixture was then homogenized in a twin screw extruder at 200°–230° C. using a residence time of 8 minutes. Following the homogenization, the extrudate from this mixture was water quenched and chopped into pellets which were dried at 100° C. under vacuum (<0.1 mm Hg). Samples of the pelletized composition were then injection molded at 250° C. The molded samples were then analyzed for graft copolymer content, amount of nylon in the graft copolymer and amount of free rubber by the coacervation procedure described above and subjected to various physical property tests. Results are shown in Table I.

In this evaluation, a control was included for comparative purposes. The control was polycaprolactam (Nylon 6) alone and was prepared by drying pellets of Nylon 6 and then injection molding them at 250° C.. Molded samples of the control were then evaluated for the same physical properties as in Example 1.

TABLE I

| Example | Control | 1 |
|---|---|---|
| Nylon 6 (wt. %)* | 100 | 85 |
| M.A. adduct of $H_2$—PBd (wt. %)* | — | 15 |
| M.A. charged for adduction (wt. %) | — | 5 |
| Analysis of Finished Composition | | |
| Graft copolymer (wt. %) | — | 37.2 |
| Nylon in Graft copolymer (wt. %)** | — | 68.7 |
| Free rubber (wt. %) | — | 1.3 |
| Properties - Molded Samples | | |
| Rockwell M | 53 | 41 |
| Notched Izod (⅛" thick bar) ft.-lb./in. | 1.1 | 15.5 |
| Notched Izod (¼" thick bar) ft.-lb./in. | 0.22 | 4.5 |
| Flexural | | |
| Modulus, psi × $10^{-5}$ | 3.56 | 2.46 |
| Strength, psi × $10^{-4}$ | 1.58 | 0.99 |
| H.D.T. (°C.) | | |
| 264 psi load | 62° | 58° |
| 66 psi load | 151° | 102° |

*amounts charged to extruder
**from % nitrogen

Examples 2-4

These examples illustrate compositions of the invention containing maleic anhydride adducts of various hydrogenated polybutadiene polymers (defined in Table II). The example compositions were prepared in accordance with the following general procedure:

A solution of the hydrogenated polymer was prepared by dissolving 200 grams of the polymer in 1272 grams of distilled toluene in a reactor equipped with heating means, thermometer, stirrer and nitrogen inlet by heating to 93° C. under nitrogen with stirring. To the reactor containing this solution was added a solution consisting of 10 grams of maleic anhydride (M.A.) in 60 mililiters (mls) of toluene (i.e., 5 percent by weight M.A. based on polymer weight). The combined solutions were then heated to 170°-190° C. with stirring until adduction of M.A. (i.e., reactions of M.A. with pendent unsaturated groups of polymer) reached a desired level as determined by infrared analysis (I.R.). The reactor was then cooled and the contents removed and dried by drum drying or extruder drying. The resultant M.A. adduct was chopped into particles, dried in a vacuum oven at 80° C. overnight and combined with pellets of Nylon 6 which had also been dried in a vacuum oven at 80° C. overnight. The resultant mixture was then homogenized by passing it through a twin screw extruder at 75 RPM using a heating profile of 232°-254°-288° C. Following homogenization, the extrudates from these mixtures were water quenched and chopped into pellets which were dried at 100° C. under vacuum (0.1 mm Hg.). The samples were then injection molded at 220° C.

Example 3 was analyzed for graft copolymer content, amount of nylon in the graft copolymer and amount of free rubber using the procedure of Example 1. The molded samples were tested for various physical properties.

For comparative purposes, a control example consisting of nylon 6 alone was prepared by drying pellets of nylon 6 and then injection molding them under the same conditions.

Compositional formulations, the analysis of Example 3 and physical property results are shown in Table II.

TABLE II

| Example | Control | 2 | 3 | 4 |
|---|---|---|---|---|
| Nylon 6 (wt. %) | 100 | 80 | 80 | 80 |
| M.A. adduct of $H_2$—Polymer (wt. %) | — | 20 | 20 | 20 |
| Amt. M.A. adducted(a) (wt. %) | — | 0.67 | 0.40 | 1.35 |
| Type $H_2$—Polymer | — | $H_2$—PBd (b) | $H_2$—PBd (c) | $H_2$—PBd (d) |
| Analysis of Finished Composition | | | | |
| Graft copolymer (wt. %) | — | — | 35.6 | — |
| Nylon in graft copolymer (wt. %) | — | — | 57.6 | — |
| Free rubber (wt. %) | — | — | 2.9 | — |
| Properties (molded samples) | | | | |
| Flexural modulus × $10^{-5}$, psi | 3.48 | 1.19 | 2.36 | 2.20 |
| Notched Izod (⅛" thick bar) ft.lb./in. | 0.80 | 17.47 | 18.96 | 17.93 |
| Notched Izod (¼" thick bar) ft.lb./in. | 0.68 | 15.00 | 18.36 | 15.36 |

(a)Amount of maleic anhydride (M.A.) incorporated in adduct.
(b)A 95% hydrogenated polybutadiene polymer having a residual unsaturation level of 5% prepared by hydrogenating to a 95% level a polybutadiene originally containing 44% 1,2-content and 56% 1,4-content.
(c)An 88% hydrogenated polybutadiene polymer having a residual unsaturation level of 12% prepared by hydrogenating to an 88% level a polybutadiene originally containing 44% 1,2-content and 56% 1,4-content.
(d)An 88% hydrogenated polybutadiene polymer having a residual unsaturation level of 12% prepared by hydrogenating to an 88% level a polybutadiene originally containing 11% 1,2-content and 89% 1,4-content.
(Note: the terms $H_2$—polymer and $H_2$—PBd above mean hydrogenated polymer and hydrogenated polybutadiene respectively).

Examples 5-7

These examples illustrate compositions of the invention containing maleic anhydride adducts of a hydrogenated polyisoprene (Ex. 5), a hydrogenated triblock copolymer of styrene/butadiene/styrene (Ex. 6) and a hydrogenated high cis-polybutadiene (Ex. 7).

The M.A. adducts of Examples 5 and 6 were prepared by reacting 5% by weight of maleic anhydride based on polymer weight with the hydrogenated polymers using substantially the same procedure set forth in Examples 2-4. The M.A. adduct of Example 7 was prepared by heating the hydrogenated high cis-polybutadiene swollen with o-dichlorobenzene in a sealed tube in the presence of 5% by weight of M.A. at 200° C. overnight. The mixture was treated with acetone and the o-dichlorobenzene was removed by distillation. The M.A. adduct was then chopped into particles and dried as set forth in Examples 2-4.

The M.A. adduct of Examples 5-7 were blended with pellets of nylon 6 and homogenized in a Brabender Plasticorder at 260°-275° C. The extrudates were then chopped into particles, pressed into plaques and compression molded.

Samples of the molded examples were tested for various physical properties in accordance with the procedure set forth in Examples 2-4. The finished composition of Example 6 was analyzed for graft copolymer content, amount of nylon in the graft and amount of free rubber as in Example 1. Composition formulations, analysis of Example 6 and physical property results are shown in Table III.

TABLE III

| Example | 5 | 6 | 7 |
|---|---|---|---|
| Nylon 6 (wt. %) | 80 | 80 | 80 |
| M.A. adduct of $H_2$—Polymer (wt. %) | 20 | 20 | 20 |
| Amt. M.A. adducted (wt. %) | 0.1 | 0.97 | 1.0 |
| Type $H_2$—Polymer | $H_2$—PI[a] | $H_2$—SBS[b] | $H_2$—cis PBd[c] |
| Analysis of Finished Composition | | | |
| Graft copolymer (wt. %) | — | 17.0 | — |
| Nylon in graft copolymer (wt. %) | — | 53.3 | — |
| Free rubber (wt. %) | — | 10.2 | — |
| Properties (molded samples) | | | |
| Flexural modulus × $10^{-5}$ psi | 2.39 | 1.61 | — |
| Notched Izod (⅛" thick bar) ft.lb./in. | 2.06 | 1.82 | 1.59 |
| Notched Izod (¼" thick bar) ft.lb./in. | 1.87 | 1.48 | — |

[a] A 98% hydrogenated polyisoprene polymer having a residual unsaturation level of 2%.
[b] A 92% hydrogenated triblock copolymer of styrene/butadiene/styrene having a residual unsaturation level of 8% prepared by hydrogenating to a 92% level a block copolymer of styrene/butadiene/styrene having a ratio of butadiene:styrene of 70:30. This copolymer was a commercial block copolymer available from Shell Chemical Co. under the designation Kraton 1101.
[c] A 92% hydrogenated polybutadiene polymer having a residual unsaturation level of 8%.

Examples 8-10

These examples further illustrate compositions of the invention containing M.A. adducts of hydrogenated polybutadiene polymers in which varying amounts of maleic anhydride were incorporated into the adduct.

The compositions were prepared and molded substantially in accordance with the procedure set forth in Examples 2-4. Samples of the molded compositions were tested for physical properties as in Examples 2-4. Composition formulations and test results are shown in Table IV.

TABLE IV

| Example | 8 | 9 | 10 |
|---|---|---|---|
| Nylon 6 (wt. %) | 80 | 80 | 80 |
| M.A. adduct of $H_2$—polymer (wt. %) | 20 | 20 | 20 |
| Amt. M.A. adducted (wt. %) | 0.96 | 1.17(est) | 0.36 |
| Type $H_2$—Polymer | $H_2$—PBd (a) | $H_2$—PBd (b) | $H_2$—PBd (c) |
| Properties (molded samples) | | | |
| Notched Izod R.T. (ft.lbs./in.) | | | |
| ⅛" thick bar | 19.4 | 16.4 | 15.4 |
| ¼" thick bar | 18.4 | 11.5 | 13.0 |
| Notched Izod, −30° C. (ft.lbs./in.) | | | |
| ⅛" thick bar | 5.72 | — | — |
| ¼" thick bar | 3.51 | 1.81 | — |

[a] A 92% hydrogenated polybutadiene polymer having a residual unsaturation level of 8% prepared by hydrogenating to a 92% level a polybutadiene originally containing 44% 1,2-content.
[b] A 90% hydrogenated polybutadiene having a residual unsaturation level of 10% prepared by hydrogenating to a 90% level a polybutadiene containing 11% 1,2-content.
[c] Same hydrogenated polymer as in [a].

Examples 11-12

These examples illustrate compositions of the invention in which the maleic anhydride adduct was prepared in a twin-screw extruder and then homogenized with nylon 6 in a twin-screw extruder. The compositions were prepared in accordance with the following general procedure:

Twenty (20) lb. samples of the hydrogenated polymer in the form of particles were fed to a twin-screw extruder operating at a barrel temperature of 280° C. and a screw speed of 150 RPM and having a throughput of 30 lbs./hr. Then, 0.4 lbs. of molten M.A. were added to the barrel through a metering pump at the rate of 6.0 grams per minute. The amounts of maleic anhydride incorporated into the polymer were determined by I.R. optical ratios. The I.R. optical ratio of the M.A. adduct of Example 11 was 3.31 indicating an approximate bound anhydride content of 0.77 weight percent while that of the M.A. adduct of Example 12 was 2.62 indicating an approximate bound anhydride content of 0.61%.

The M.A. adducts in particle form were then blended with pellets of nylon 6 in a twin-screw extruder having a barrel temperature of 300° C., a screw speed of 80

RPM and a throughput of 45 lbs./hr. Samples of the extrudates from these examples were then chopped into particles and injection molded.

Samples of the molded compositions were analyzed for compositional components and subjected to various physical property tests. Composition formulations, analysis of finished compositions and physical property results are shown in Table V.

TABLE V

| Example | 11 | 12 |
|---|---|---|
| Nylon 6 (wt. %)* | 80 | 80 |
| M.A. adduct of $H_2$—Polymer (wt. %)* | 20 | 20 |
| Type $H_2$—Polymer | $H_2$—PBd[a] | $H_2$—PBd[b] |
| Analysis of Finished Compositions | | |
| Graft copolymer (wt. %) | 35.7 | 38.7 |
| Nylon in graft copolymer (wt. %) | 61.6 | 63.8 |
| Free rubber (wt. %) | 6.2 | 1.1 |
| Properties (molded samples) | | |
| Tensile at yield × $10^{-3}$, psi | 7.1 | 7.6 |
| Tensile at break × $10^{-3}$, psi | 6.0 | 6.3 |
| Elongation at break, % | 110 | 130 |
| Flexural strength × $10^{-3}$, psi | 10.2 | 10.7 |
| Flexural modulus × $10^{-5}$, psi | 2.61 | 2.73 |
| Izod Impact, ft. lbs./in. | | |
| Notched ¼" thick bar R.T. | 19.3 | 17.9 |
| Notched ⅛" thick bar R.T. | 15.9 | 13.2 |
| Notched ¼" thick bar, 0° C. | 16.9 | 6.2 |
| Notched ¼" thick bar, −10° C. | 16.2 | 4.0 |
| Notched ¼" thick bar, −20° C. | 17.1 | 3.6 |
| Notched ¼" thick bar, −30° C. | 6.6 | 2.2 |
| Notched ¼" thick bar, −40° C. | 3.8 | 2.1 |

[a] A 92% hydrogenated polybutadiene polymer having a residual unsaturation level of 8% prepared by hydrogenating to a 92% level a polybutadiene originally containing 40% 1,2-content (i.e., medium vinyl pbd).
[b] A 90% hydrogenated polybutadiene polymer having a residual unsaturation level of 10% prepared by hydrogenating to a 90% level a polybutadiene originally containing 11% 1,2-content.
*amounts as originally charged.

As the above data indicates, the low temperature impact resistance of these compositions is excellent.

Example 13

In this example, a composition was prepared from a formulation originally containing 50 parts by weight of nylon 6 and 50 parts by weight of the maleic anhydride adduct of an 88% hydrogenated polybutadiene originally containing 44% 1,2-content, said adduct having an average maleic anhydride content of 0.61 weight percent. The composition was prepared and molded substantially in accordance with the procedure set forth in Examples 2-4.

A sample of the molded composition was evaluated for Izod impact strength at room temperature as in Examples 2-4. The sample flexed but did not break during the test indicating a very high impact resistance.

We claim:

1. Impact resistanct polymeric compositions comprising:
    (a) from 70 to 85 percent by weight of a polyamide having a number average molecular weight of at least 15,000; and
    (b) from 15 to 30 percent by weight of a maleic anhydride adduct of a hydrogenated polymer of a conjugated diene or hydrogenated copolymer of a conjugated diene and a vinyl aromatic hydrocarbon, said hydrogenated polymer or copolymer having a residual unsaturation content of from about 0.5 to about 20% of its original unsaturation content prior to hydrogenation, wherein from 5 to 40 percent by weight of components (a) and (b) are present in the form of a graft copolymer containing at least 20 percent of polyamide.

2. The composition of claim 1 wherein said polyamide is selected from the group consisting of polycaprolactam, polyhexamethylene adipamide, polyundecanolactam and polydodecanolactam.

3. The composition of claim 1 wherein said polyamide is polycaprolactam.

4. The composition of claim 1 wherein said maleic anhydride adduct contains from 0.1 to 25 percent by weight of maleic anhydride.

5. The composition of claim 4 wherein said maleic anhydride adduct contains from 0.2 to 5 percent by weight of maleic anhydride.

6. The composition of claim 1 wherein said maleic anhydride adduct is a maleic anhydride adduct of a hydrogenated polybutadiene.

7. The composition of claim 1 wherein said maleic anhydride adduct is a maleic anhydride adduct of a hydrogenated random copolymer of butadiene and styrene.

8. The composition of claim 7 wherein said random copolymer contains up to 60 percent by weight of styrene.

9. The composition of claim 1 wherein said maleic anhydride adduct is a maleic anhydride adduct of a hydrogenated block copolymer of butadiene and styrene.

10. The composition of claim 1 wherein said maleic anhydride adduct is a maleic anhydride adduct of a hydrogenated multiblock copolymer of butadiene and styrene.

11. The composition of claim 10 wherein said multiblock copolymer is a styrene/butadiene/styrene block copolymer.

12. The composition of claim 1 wherein component (a) is present in an amount of from 80 to 85 percent by weight and component (b) is present in an amount of from 15 to 20 percent by weight.

* * * * *